United States Patent Office 2,815,390
Patented Dec. 3, 1957

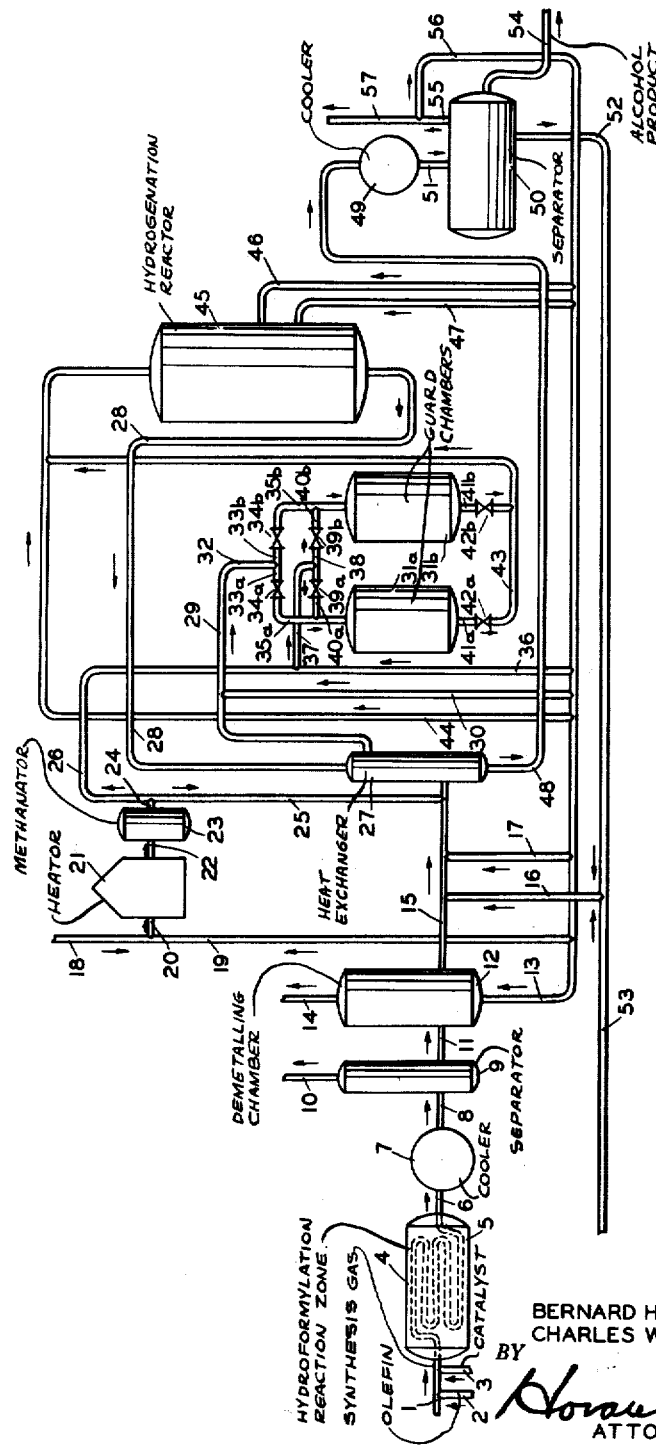

2,815,390

REMOVAL OF METAL CARBONYLS AND OTHER CONNATE IMPURITIES IN OXO PROCESS

Bernard H. Gwynn, Tarentum, and Charles W. Montgomery, Oakmont, Pa., assignors to Gulf Research & Development Company, Pittsburgh, Pa., a corporation of Delaware Application July 30, 1953, Serial No. 371,347

3 Claims. (Cl. 260—638)

This invention relates to a process for the production of alcohols by the reaction between synthesis gas comprising hydrogen and carbon monoxide and an olefin or olefins to produce aldehydes, which are then preferably hydrogenated to the corresponding alcohols. This invention relates more particularly to an improvement in the hydrogenation stage of such process.

The process for the manufacture of alcohols from an olefin or olefins and a synthesis gas comprising hydrogen and carbon monoxide is generally known as the Oxo process. In the first stage of the process, sometimes referred to as the hydroformylation stage, an organic compound containing olefinic linkages is reacted with a synthesis gas comprising hydrogen and carbon monoxide at an elevated temperature and an elevated pressure in the presence of a catalyst containing metals of the iron group, such as nickel, cobalt or iron, to produce a hydroformylation product comprising predominantly aldehydes containing one more carbon atom than the reacted olefins, as well as some alcohols, aldols, acetals, unreacted constituents, namely hydrogen, carbon monoxide and olefins, and the hydroformylation catalyst in the form of a dissolved metal carbonyl. This hydroformylation product is subsequently treated in a second stage to decompose and remove the catalytic metal carbonyl, after which the demetalled hydroformylation reaction product is passed to the hydrogenation stage where the aldehydes are hydrogenated in the presence of a hydrogenation catalyst to the corresponding alcohols.

The hydrogenation stage of the Oxo process is an extremely critical one, since if the hydrogenation catalyst is deactivated the alcohol product obtained will be of poor quality and commercially unacceptable. In order to avoid damage to the hydrogenation catalyst, assure long catalyst life and obtain alcohols of desired purity, close control of the operating conditions and reactants employed in each stage of the Oxo process, and particularly in the hydrogenation stage, have been maintained. However, while maintenance of these controls has increased the effective life of the catalyst, fairly frequent regeneration and periodic replacement of the hydrogenation catalyst have been necessary.

Damage to the hydrogenation catalyst can come from several sources. Quite often the olefin feed to the hydroformylation stage carries with it some sulfur or one or more sulfur compounds in varying amounts, which find their way to the hydrogenation chamber where they tend to poison the hydrogenation catalyst and destroy the efficiency of the hydrogenation process. Also, it is not always possible to remove from the hydroformylation product in the demetalling stage all of the metal carbonyls that are present in that product. For example, the charge to the hydrogenation stage frequently contains carbonyls of metals such as those of iron, nickel, chromium and molybdenum which may be introduced into the hydroformylation product as a result of reaction with the walls of the reactor, transfer lines, etc. These metal carbonyls may not be entirely removed in the demetalling stage and may be decomposed in the hydrogenation reactor with the result that the corresponding metals deposit on the hydrogenation catalyst and further reduce the activity thereof. Therefore while the second stage of the process may be termed a "demetalling zone" and the product obtained a "demetalled hydroformylation reaction product," one or more of the carbonyls of iron, nickel, chromium and molybdenum may be present in such product. Under the reaction conditions employed in the hydrogenation reactor, some of the organic constituents in the hydroformylation reaction product tend to polymerize, condense and/or decompose to leave deposits on the catalyst surface, to still further reduce the activity thereof.

We have found that the hydrogenation stage of the Oxo process can be improved and the necessity of replacing and/or regenerating the hydrogenation catalyst in the hydrogenation reactor can be virtually eliminated for long periods of time by contacting the hydroformylation reaction product from the second or demetalling stage of the process, prior to its entry into the hydrogenation zone, with a metallic hydrogenation catalyst in the free metal or oxide form, in which the metal is selected from the metals of group VIII of the periodic table, especially a nickel catalyst, at an elevated temperature and pressure and preferably in the presence of hydrogen, whereby metal carbonyls not removed in the second stage of the process, sulfur or sulfur compounds, and organic constituents which would tend to deposit upon the hydrogenation catalyst in the hydrogenation zone under conventional operating conditions, are removed from the hydroformylation reaction product obtained in the second stage.

In accordance with the preferred embodiment of the invention, the hydroformylation reaction product from the demetalling stage carrying one or more undesirable contaminants such as sulfur or sulfur compounds, carbonyls of iron, nickel, chromium and molybdenum and organic constituents tending to polymerize, condense and/or decompose at the hydrogenation pressure and temperature employed, prior to its passage to the hydrogenation reactor is flowed through a chamber, hereinafter referred to as a guard chamber, containing a nickel catalyst, maintained at an elevated temprature and elevated pressure, at such a rate as to remove therein said sulfur or sulfur compounds, decompose and remove said metal carbonyls and remove said organic constituents subject to polymerization, condensation and/or decomposition in the hydrogenation reactor.

In this embodiment, the product from the demetalling stage is contacted with the catalyst in the presence of hydrogen, and the pressure and temperature are such as to produce hydrogenating conditions in the guard chamber so that in addition to the other results pointed out above, some hydrogenation of the aldehydes in the product to alcohols is accomplished. The catalyst employed in the guard chamber can be the same catalyst as that employed in the hydrogenation reactor and in such cases the amount of catalyst employed in the guard chamber will be substantially smaller than the amount employed in the hydrogenation reactor.

In its preferred aspects, the invention comprises employing at least two guard chambers in parallel, which chambers are alternately on-stream and being regenerated or having catalyst replaced. Because of the removal of sulfur, sulfur compounds, metals and other undesirable constituents from the product from the demetalling stage accomplished in the guard chamber, fairly frequent regeneration of the catalyst in the guard chamber is necessary. However, since the product from the guard chamber will be substantially free from materials acting to contaminate and reduce the activity of the catalyst in the hydrogenation reactor, the regeneration or replacement of the catalyst in that reactor need be accomplished only at very infrequent intervals. The ultimate result therefore of the use of a guard chamber, and preferably at least two of such guard chambers, is to make possible long on-stream periods for the Oxo plant as a whole.

The catalyst employed in the guard chamber is preferably a reduced nickel oxide. The reduction may be any desired amount, from almost complete reduction to the slightest, although for best results we prefer to employ reduced nickel oxide wherein the reduction is from about 20 to about 80 percent. The catalyst may be mounted on a suitable carrier if desired.

The sulfur, either in the form of the pure compound or as a sulfur-containing compound, which may be present in the original olefin feed, and which finds its way into the hydroformylation reaction product, is believed to react with the nickel catalyst in the guard chamber, at the pressure and temperature employed therein, to form nickel sulfide and is thereby removed from the hydroformylation reaction product. At the temperatures and pressures employed in the guard chamber any carbonyls of iron, nickel, chromium and molybdenum not decomposed and removed in the demetalling stage are decomposed and removed in the guard chamber, simultaneously depositing the free metals on the catalyst surface. Since the free metals resulting from the decomposition deposit on the catalyst surface, they are therefore prevented from finding their way into the hydrogenation reactor.

The high temperatures and pressures employed in the guard chamber are also sufficient to polymerize, condense and/or decompose some of the organic constituents in the hydroformylation reaction mixture removed from the second or demetalling stage, and these are also deposited on the catalyst surface in the guard chamber. While the average temperatures employed in the guard chamber are preferably lower than those employed in the hydrogenation reactor, the temperatures are approximately the same as the temperatures desired in the hydrogenation reactor. Also the pressure is preferably substantially the same as the hydrogenation pressure. Accordingly, the organic constituents in the demetalled hydroformylation reaction product which would ordinarily polymerize, condense and/or decompose in the hydrogenation reactor are polymerized, condensed and/or decomposed in the guard chamber instead and are therefore prevented from entering the hydrogenation reactor and poisoning the hydrogenation catalyst therein.

In order to obtain the maximum benefits of our invention not only is it important that a catalyst as described above be employed in the guard chamber, but also the temperatures in the guard chamber must be carefully controlled.

The catalyst employed in the guard chamber, in addition to removing the above-noted undesirable contaminants from the demetalled hydroformylation reaction product, also functions as a hydrogenation catalyst. Therefore, as noted above, depending on the activity of the catalyst as a result of contamination, poisoning, etc., a substantial amount of hydrogenation of the aldehydes in the demetalled hydroformylation reaction product occurs in the guard chamber. Since the guard chamber is preferably operated under adiabatic conditions (i. e., the hydroformylation reaction product is flowed through the guard chamber in the absence of heat exchange means, and all heat produced, other than minor losses from the sides of the chamber, are removed in the product leaving the chamber), and the hydrogenation reactions occurring in the guard chamber are exothermic in nature and release heat, the products leaving the guard chamber are at a higher temperature than those entering the guard chamber. However, in order to efficiently remove contaminants such as sulfur, the remaining metal carbonyls and polymerization, condensation and/or decomposition products from the demetalled hydroformylation reaction product, prevent appreciable hydrocracking reactions from taking place and obtain maximum hydrogenation in the guard chamber, the maximum reaction temperature in the guard chamber should be no higher than about 400° F., and preferably from about 380° to about 400° F. The temperature of the demetalled hydroformylation reaction product entering the guard chamber must be high enough to permit the desired reactions to take place therein but low enough so that the temperature rise of the products passing therethrough at the selected space velocity (volume of hydroformylation charge/volumes of catalyst/hour) will not raise the temperature of the products above the maximum allowable reaction temperature noted above. The temperature of the incoming demetalled hydroformylation reaction product is preferably maintained at about 290° to about 380° F., preferably about 300° to about 370° F. as required, depending on the space velocity, to produce an exit temperature within the maximum temperature range given above.

The pressure in the guard chamber is preferably maintained at about 50 to about 5000 pounds per square inch, especially from about 250 to about 3500 pounds per square inch. A space velocity of about 3 to about 12, preferably from about 4 to about 8, based upon the demetalled hydroformylation reaction product, has been found to be satisfactory; the specific space velocity within these ranges maintained in a particular case will be selected to achieve the results referred to above. To the feed entering the guard chamber water or steam is preferably added to cut down on acetal formation, polymerization of aldehydes and to aid in controlling the temperatures in the guard chamber and the hydrogenation reactor. A presence of about ⅛ to about ½ gallon, preferably about ⅛ to about ¼ gallon, of water per gallon of demetalled hydroformylation reaction product other than any water present therein, is ordinarily sufficient to obtain the desired results. Preferably the water in the demetalled hydroformylation reaction product is not allowed to fall below about ⅛ gallon per gallon of demetalled hydroformylation reaction product to guard against an excessive temperature rise in the guard chamber. On the other hand, if more than ½ gallon of water per gallon of demetalled hydroformylation reaction product is present, disintegration of the catalyst because of the carrier used, such as kieselguhr, in the guard chamber is likely to occur. Sufficient hydrogen which may be heated is preferably added to the demetalled hydroformylation reaction product, prior to its entry into the guard chamber, to lower or raise its temperature to that desired for the reactions occurring in the guard chamber. Excess hydrogen passes along with the product to the hydrogenation reactor.

As previously pointed out, the catalyst in the guard chamber will be contaminated and deactivated in a relatively short time due to its contact with contaminants such as sulfur or sulfur-containing compounds and the deposition thereon of the free metals resulting from the decomposition of the metal carbonyls therein and the decomposition, condensation and/or polymerization products formed therein. It therefore becomes important to regenerate and/or replace the catalyst in the guard chamber at periodic intervals. The process for the hydrogenation of aldehydes in the Oxo process in accordance with our invention is made continuous by using at least two guard chambers in parallel so that as it becomes necessary to regenerate and/or replace the catalyst in one guard chamber, the demetalled hydroformylation reaction product can be diverted therefrom and passed through a guard chamber in parallel therewith containing fresh or regenerated catalyst, thereby insuring uninterrupted operation of the process. The spent catalyst in the guard chamber taken off-stream can then be replaced and/or regenerated.

As the catalyst in the guard chamber becomes fouled and hydrogenation therein is reduced, the temperature rise of the products passing therethrough will decrease. In order to maintain the maximum reaction temperature in the guard chamber, it will then become necessary to increase the temperature of the inlet product. But since the catalyst has lost a substantial amount of its activity and is incapable of efficiently removing the undesirable substances in the demetalled hydroformylation reaction product, it therefore becomes necessary to regenerate and/or replace the catalyst at periodic intervals. Thus, as it becomes more difficult to correlate the temperature of the incoming products and the desired maximum temperature in the guard chamber, it becomes apparent that it is necessary to switch to a fresh guard chamber and regenerate.

In regenerating the spent catalyst in the guard chamber the catalyst is preferably initially purged with hot hydrogen gas and then flushed with steam. The catalyst is then brought up to a temperature of about 800° to about 900° F., preferably with hot inert gas such as nitrogen or carbon dioxide, after which sufficient air is introduced to maintain a burning zone temperature of about 900° to about 1000° F. Following the burning off the catalyst surface of the undesirable contaminants, several alternative procedures may be employed to prepare the catalyst for reuse. In the first procedure the catalyst is cooled with an inert gas to a temperature of about 300° to about 400° F. and is used as such without reduction. In the second procedure the catalyst is cooled to about 600° F. with an inert gas, pressured with hydrogen gas to about 1000 pounds per square inch, and the catalyst is then reduced with hydrogen at a temperature of about 500° to about 750° F. The reduction of the nickel catalyst may be from about 20 to about 80 percent. Reduction of catalyst to about 40 to about 60 percent is especially preferred since such catalyst is sufficiently active for purposes of this invention and greater reduction involves longer regeneration periods and greater expense out of proportion of the value of the catalyst obtained. The third procedure involves cooling the reactor to a temperature of about 700° F. with an inert gas and reducing with hydrogen at about atmospheric pressure. The second procedure for regenerating the catalyst is preferred, because it produces a catalyst of high activity, which activity is maintained for a long period of time. Prior to placing the catalyst on stream, regardless of the treatment to which the catalyst was subjected, it is advisable that it be steamed with superheated steam in order to avoid an excessive temperature rise, which is probably due to the heat of adsorption of the liquid on the dry catalyst.

By operating in accordance with our invention, therefore, undesirable contaminants or constituents in the demetalled hydroformylation reaction product tending to poison the hydrogenation catalyst in the hydrogenation zone and reduce its efficiency are removed from the demetalled hydroformylation reaction product prior to its entry into the hydrogenation reactor and therefore are in no position to poison the hydrogenation catalyst, shorten its life, or adversely affect the hydrogenation products, particularly alcohols, obtained in the hydrogenation reactor. By employing at least two guard chambers in parallel, we are able to continuously operate the Oxo process, assure long catalyst life in the hydrogenation reactor as well as obtained alcohols of high purity.

In order that the invention may be understood more fully, reference should be had to the accompanying drawing, the single figure of which is a diagrammatic flow diagram showing a typical method of carrying out a preferred embodiment of our invention for the production of alcohols using as raw materials synthesis gas and olefins. In the drawing the showing of some flow devices has been omitted in the interest of clarity. The drawing is hereby incorporated in and made a part of this specification.

Synthesis gas containing hydrogen and carbon monoxide in molar ratio of about one to one substantially free of carbon dioxide and an elevated pressure of about 1500 to 4500 pounds per square inch, preferably about 3500 pounds per square inch, is flowed through line 1, where it is joined by an olefin or olefins in line 2 and the hydroformylation catalyst in line 3. The mixture is then passed to hydroformylation reaction zone 4, which is in the form of an elongated coil reactor 5. The olefin may be any suitable olefin, for example heptene, and the catalyst is preferably a cobalt salt of any suitable organic acid such as a fatty acid, preferably one containing at least 6 carbon atoms or a naphthenic acid. Preferred salts are cobalt octonoate and cobalt naphthenate. In general the catalyst should be introduced in an amount corresponding to about one atomic proportion of cobalt for each 600 mols of olefins, while one mol of olefin should be used per mol each of hydrogen and carbon monoxide. Coil reactor 5 is preferably operated at a pressure of about 1500 to about 4500 pounds per square inch and a temperature of about 260° to about 460° F., depending upon the feed rate and other reaction conditions.

Liquid hydroformylation reaction product comprising predominately aldehydes and containing unreacted synthesis gas and metal carbonyls is removed from coil reactor 5 and is transferred by line 6 to cooler 7, where the product is cooled to a temperature of about 110° F., and then passed through line 8 to separator 9, where the unreacted gases containing entrained liquid and some metal carbonyls, predominantly cobalt carbonyl, are removed by line 10. If desired, the unreacted gases can be scrubbed to remove the metal carbonyl and entrained liquid therefrom and the gases recycled to hydroformylation reaction zone 4.

The stream of hydroformylation reaction product leaving separator 9, carrying with it substantial amounts of cobalt carbonyl, some iron carbonyl and lesser amounts of nickel, chromium and molybdenum carbonyls, is passed through line 11 to demetalling chamber 12. The demetalling chamber may be packed with pumice and can be maintained at a temperature of about 210° to about 400° F. and a pressure of about 25 to about 500 pounds per square inch. At these temperatures and pressures cobalt carbonyl decomposes to deposit cobalt on the pumice and release carbon monoxide. However, some of the remaining metal carbonyls may remain unaffected and continue through with the hydroformylation reaction product. The hydroformylation reaction product can be heated to the desired temperature in demetalling chamber 12 by steam coils or any other suitable means. If desired, hydrogen can be introduced into demetalling chamber 12 through line 13. Hydrogen thus added aids in removing from the demetalling chamber the carbon monoxide resulting from the decomposition of the cobalt carbonyl and decreasing the partial pressure of the carbon monoxide. Hydrogen and the carbon monoxide can be removed from demetalling chamber 12 through line 14. The liquid hydroformylation reaction product, substantially free of cobalt, but carrying with it one or more contaminants such as dissolved iron, nickel, chromium and molybdenum carbonyls in greater or lesser amount as well as sulfur compounds and organic constituents tending to polymerize, condense and/or decompose in the hydrogenation reactor, is removed from demetalling chamber 12 by line 15, and is joined by water or steam condensate in line 16 and recycled hydrogen in line 17.

Fresh hydrogen enters the system through line 18 and additional recycled hydrogen through line 19, the resulting mixture passing through line 20 to heater 21. The hydrogen leaving the heater through line 22 at a temperature of about 500° F. is passed to methanator 23, preferably containing an active nickel catalyst. Under these conditions any carbon monoxide which may be present in the hydrogen gas is converted to methane, and the resulting hydrogen gas containing a trace of methane is removed from methanator 23 by line 24. A portion of the heated hydrogen gas in line 24 passes through line 25 and joins the mixture of demetalled hydroformylation reaction product, water or steam condensate and recycled hydrogen in line 15. The remainder of the heated hydrogen in line 24 passes through line 26 for reasons to be hereinafter described. The resulting mixture in line 15 is then passed to heat exchanger 27 where it is heated to a temperature of about 350° to about 380° F. through heat exchange with the hydrogenation product from the hydrogenation reactor which is led to heat exchanger 27 by line 28.

The heated mixture of demetalled hydroformylation reaction product, hydrogen and water or steam condensate is removed from heat exchanger 27 by line 29. As stated, in order to maintain the exit temperature in the guard chamber at about 380° to about 400° F., the mixture comprising the demetalled hydroformylation product should enter the guard chamber at a temperature of about 290° to about 380° F. In order to maintain this inlet temperature and to supply the additional hydrogen needed in the guard chamber and hydrogenation reactor, cooled recycled hydrogen is added to the mixture line 29 through line 30 bringing the temperature of the hydroformylation mixture entering the guard chamber to about 290° to about 380° F.

The mixture comprising the demetalled hydroformylation reaction product, water or steam condensate and hydrogen at the desired temperature is passed to one of guard chambers 31a and 31b, filled with a nickel catalyst such as about 50 percent reduced nickel oxide on kieselguhr, the catalyst containing about 20 to about 50 weight percent nickel as the free metal. Operation of one of the guard chambers will be described, but it is understood that they may be operated in parallel when switching from one guard chamber to the other. The same reference numerals, but with different subscripts, will be employed to describe the guard chambers and similar lines leading to and from the guard chambers.

In this case, it will be assumed that guard chamber 31a is in operation. The mixture in line 29 is passed through lines 32 and 33a, valve 34a and line 35a to guard chamber 31a. Additional hydrogen, as desired, may be added to the mixture in line 35a through lines 26 or 36 and lines 37 and 38, valve 39a and line 40a. In this chamber sulfur or sulfur compounds which may be present in the demetalled hydroformylation reaction product react with the nickel catalyst and are removed therefrom. At the high temperatures employed any iron, nickel, chromium and molybdenum carbonyls present and which were not removed in demetalling chamber 12 are decomposed and the free metals are deposited on the catalyst surface. Simultaneously the organic constituents in the decobalted hydroformylation reaction product tending to polymerize, condense and/or decompose at the temperature and pressure employed therein are deposited on the catalyst surface. In addition, depending upon the activity of the catalyst at any particular stage and the amount of hydrogen present, more or less hydrogenation of the aldehydes in the demetalled hydroformylation reaction product to alcohols occurs therein.

The product leaving chamber 31a, substantially free of sulfur, metal carbonyls and organic constituents tending to polymerize, condense and/or decompose at the temperatures and pressures employed either in the guard chamber or hydrogenation reactor, is removed from the guard chamber through line 41a and passed through valve 42a and line 43 to line 44 where it is joined by additional cold recycled hydrogen. The resulting cooled mixture is flowed to hydrogenation reactor 45 at a temperature of about 300° to about 380° F. If sufficient hydrogen is already present in the product leaving the guard chamber for the desired reactions to occur in the hydrogenation reactor, the product can be cooled to a temperature of about 300° to about 380° F. in any desired manner, for example by indirect heat exchange with a cooling medium. The hydrogenation reactor, like the guard chamber, is operated under adiabatic conditions and is packed with a suitable hydrogenation catalyst, preferably a nickel catalyst, similar to that used in the guard chamber, and is maintained at a pressure of about 50 to about 5000 pounds per square inch and a maximum temperature of about 380° to about 400° F. At these temperatures and pressures, efficient hydrogenation of aldehydes to alcohols is obtained. Additional hydrogen for hydrogenation in reactor 45 may be passed to the hydrogenation reactor by lines 46 and 47. The product obtained in the hydrogenation reactor is removed through line 28 and passed to heat exchanger 27 where, as noted, the hot hydrogenation product aids in heating the mixture comprising the demetalled hydroformylation reaction product on its way to the guard chamber.

The hydrogenation product is removed from heat exchanger 27 through line 48 and passed to cooler 49 where the product is cooled to a temperature of about 110° F. and then flowed to separator 50 through line 51. In separator 50, water is removed through line 52 and recycled to line 16, which, along with steam condensate in line 53, makes up the water added to line 15 through line 16. The desired alcohol product is removed through line 54 and hydrogen is removed through line 55. A portion of this hydrogen is recycled through line 56 to lines 46, 47, 36, 30, 44, 17, 19 and 13. The remainder of the hydrogen in line 55 may be vented to the atmosphere through line 57.

In the foregoing description a discussion of the various amounts of products, water or steam condensate and hydrogen flowing through the various lines leading to and from the guard chamber has been omitted in the interest of clarity. These relative proportions may be described best by reference to a specific condition of operation. In a specific case where 4 gallons per minute of decobalted hydroformylation reaction product is flowed through line 15, it is joined by about 0.75 gallon per minute of water or steam condensate through line 16. 10,000 standard cubic feet per hour of fresh hydrogen is passed through line 18 and 20,000 standard cubic feet per hour of recycled hydrogen is passed through line 19, the resulting mixture being passed through line 20 to heater 21. The heated hydrogen gas leaving heater 21 at a temperature of about 500° F. is passed through line 22 to methanator 23, and a portion of the resulting gas is passed to line 15 through line 25. Depending upon the amounts of aldehydes hydrogenated to the corresponding alcohols in the guard chamber and the amount of heat released thereby, sufficient recycled hydrogen must be injected ahead of the guard chamber to maintain the desired inlet temperature of the hydroformylation reaction product at about 290° to about 380° F. and the exit temperature of about 380° to about 400° C. This hydrogen may be introduced into the mixture comprising the hydroformylation reaction product through line 30, and, if additional hydrogen be needed, through lines 26 or 36 and 37 and 38, valve 39a and line 40a. Under these conditions a space velocity in the guard chamber of about 3 to about 12 based on the hydroformylation reaction product should be maintained. We have found that such operation will virtually eliminate the need to replace and/or regenerate the hydrogenation catalyst in the hydrogenation zone but that the nickel catalyst in the guard chamber will be regenerated or, when necessary, replaced periodically. We have obtained excellent results by regenerating and/or replacing the catalyst between about 48 to about 96 hours of operation.

We have found that best results are obtained in accordance with our invention by correlating the amount of catalyst employed in the guard chamber with that in the hydrogenation reactor. Thus the total amount of catalyst in either of the guard chambers should vary from about one-fourth to about one-sixteenth of that employed in the hydrogenation reactor, and preferably should be approximately one-eighth the amount employed in the hydrogenation reactor. If the amount of catalyst in the guard chamber is less than about one-sixteenth, the catalyst would be contaminated in a very short time, and regeneration and/or replacement thereof would be too frequent to be practical. If the amount of catalyst employed in the guard chamber is greater than about one-fourth of that employed in the hydrogenation reactor, regeneration and/or replacement of the catalyst therein would be complicated by the relatively large amounts of catalyst that would require handling.

As indicated previously, the temperature of the charge to the guard chamber and the space velocity maintained are correlated so that a selected desirable exit temperature of the products leaving this chamber is maintained. Since the heat produced in the guard chamber is reduced as the activity of the catalyst decreases, it is not possible to maintain the selected exit temperature throughout the on-stream period. It will be understood that the selected exit temperature within the range of exit temperatures given above will vary depending upon the specific catalyst employed and the nature of the hydroformylation reaction product charged to the guard chamber. We have found that the time when the on-stream period should be stopped can be ascertained by observing the decrease in the temperature rise through the guard chamber. While it is not possible to state a specific temperature rise at which the on-stream period should be stopped, because this will vary depending upon the specific nature of the catalyst and the composition of the hydroformylation reaction product charged to the guard chamber, we have found that in general the on-stream period should be stopped when the temperature rise is less than about 10° to about 20° F.

The following examples illustrate the advantages of a guard chamber in the operation of our process. Example 1 shows the results obtained in hydrogenating a decobalted hydroformylation product in the conventional manner.

EXAMPLE 1

A charge product obtained from a decobalting tower containing from about 65 to about 75 percent aldehydes and about 0.015 weight percent of iron was passed to a hydrogenation reactor at the rate of 1800 milliliters per hour along with 400 milliliters per hour of water and 127 standard cubic feet per hour of hydrogen. The hydrogenaton reactor contained ⅛" pelleted nickel catalyst (about 50 percent nickel as nickel oxide on kieselguhr) and was maintained at a temperature of about 380° F. and a pressure of about 1000 pounds per square inch gauge. A space velocity of about one was employed. The results of this run are set forth in Table I.

Table I

| Elapsed time, hrs. | Aldehyde content of product, weight percent |
|---|---|
| 29 | 0.11 |
| 58 | 0.13 |
| 84 | 0.17 |
| 147 | 0.64 |
| 219 | 0.93 |
| 252 | 1.72 |

In order to insure a product that is commercially acceptable, it is ordinarily necessary that the hydrogenation product, i. e., alcohols, obtained have an aldehyde content below about 0.5 weight percent. If the data in the above table be graphed, it will be seen that conventional hydrogenation of a decobalted hydroformylation reaction product can be run only about 138 hours before the aldehyde content of the product is about 0.5 weight percent, after which the catalyst must be either regenerated or replaced.

The following example illustrates operation wherein the decobalted hydroformylation reaction product is passed through a guard chamber prior to hydrogenating.

EXAMPLE 2

In accordance with one mode of operation of our invention, we have run a decobalted hydroformylation reaction product through a guard chamber prior to hydrogenating in the conventional manner as in Example 1. The guard chamber was packed with ⅛" pelleted nickel catalyst (about 50 percent nickel as nickel oxide on kieselguhr). The minimum inlet temperature of the decobalted hydroformylation reaction product was maintained at about 300° F., while the maximum temperature in the guard chamber varied from about 397° to about 417° F. While the maximum temperature obtained in the guard chamber was about 417° F. this was only for a short period, the average maximum exit temperature therein being maintained at about 400° F. The charge to the guard chamber comprised 1800 milliliters per hour of decobalted hydroformylation reaction product containing about 65 to about 75 percent aldehydes and about 0.0015 weight percent of iron, 200 milliliters per hour of water and 100 standard cubic feet per hour of hydrogen. The hydrogenation reactor was packed with ⅛" pelleted nickel catalyst (about 50 percent reduced nickel as nickel oxide on kieselguhr) and maintained at a temperature of about 380° F. and a pressure of about 1000 pounds per square inch gauge. A space velocity of one was maintained in the hydrogenation reactor and a space velocity of 3.6 was employed in the guard chamber. The charge to the hydrogenation reactor comprised the total product obtained from the guard chamber. The guard chamber was charged with a new bed of catalyst after 57 hours and was regenerated eight times thereafter, the period between regenerations averaging about 78 hours while there was no regeneration of the hydrogenation catalyst. The results of these runs are tabulated below in Table II.

Table II

HYDROGENATION REACTOR

| Elapsed time, hrs. | Aldehyde content of product, weight percent |
|---|---|
| 10 | 0.035 |
| 57 | 0.036 |
| 87 | 0.031 |
| 147 | 0.026 |
| 261 | 0.033 |
| 682 | 0.035 |

The above example illustrates the ability of the guard chamber to maintain the aldehyde content of the product well within the desired specification for an extremely long period of time without need of regenerating and/or replacing the hydrogenation catalyst. As shown in Table I, by employing only a hydrogenation reactor and operating in the conventional manner the aldehyde content of the hydrogenation product was above the desired amount at the end of about 138 hours. However, as shown in Table II, by passing the decobalted hydroformylation reaction product through a guard chamber packed with a reduced nickel oxide catalyst prior to hydrogenating, it is possible to operate for extended periods of time without regenerating and/or replacing the hydrogenation catalyst and still obtain a hydrogenation product well within the desired specification. In fact at the end of 682 hours of operation the aldehyde content of the hydrogenation product was no more than it was after operation of the first 10 hours.

It will be seen from the foregoing description that the present invention provides an efficient process for the manufacture of alcohols. Thus by employing a guard chamber to remove undesirable constituents present in a demetalled hydroformylation reaction product, it is possible to obtain a satisfactory product from the hydrogenation reactor and substantially eliminate the need to replace and/or regenerate the catalyst ordinarily employed in hydrogenation processes forming a part of the Oxo process, and as noted by employing at least two guard chambers we can make our process a continuous one.

Obviously many modifications and variations of the invention as hereinbefore set forth may be made without departing from the spirit and scope thereof and therefore only such limitations should be imposed as are indicated in the appended claims.

We claim:

1. A process for the production of alcohols which comprises reacting a synthesis gas containing hydrogen and carbon monoxide with an olefin in a hydroformylation reaction zone at a hydroformylation reaction temperature and hydroformylation reaction pressure to form an aldehyde product contaminated with cobalt carbonyl and iron carbonyl, passing the aldehydic product to a demetalling zone containing a packing material, maintaining a temperature in said demetalling zone of about 210° to about 400° F., whereby cobalt carbonyl is decomposed and elemental cobalt is deposited on said packing material, removing the treated aldehydic product from said demetalling zone substantially free of elemental cobalt and passing the same into a contact zone at a temperature of about 290° to about 380° F. containing a metal catalyst selected from the metals of group VIII of the periodic table, flowing said aldehydic product through said contact zone together with hydrogen under adiabatic conditions adjusted to produce at the exit end of said zone a temperature in excess of that of the incoming aldehydic product and obtain appreciable hydrogenation of aldehydes present in the aldehydic product and decomposition of said iron carbonyl, and thereafter flowing the aldehydic product from said contact zone in the presence of hydrogen directly without loss of heat and without further addition of heat to a hydrogenation zone containing a metallic hydrogenation catalyst and maintained at an elevated pressure and temperature sufficient to hydrogenate the remaining aldehydes in the aldehydic product to the corresponding alcohols.

2. A process for the production of alcohols which comprises reacting a synthesis gas containing hydrogen and carbon monoxide with an olefin in a hydroformylation reaction zone at a hydroformylation reaction temperature and hydroformylation reaction pressure to form an aldehydic product contaminated with cobalt carbonyl and iron carbonyl, passing the aldehydic product to a demetalling zone containing a packing material, maintaining a temperature in said demetalling zone of about 210° to about 400° F., whereby cobalt carbonyl is decomposed and elemental cobalt is deposited on said packing material, removing the treated aldehydic product from said demetalling zone substantially free of elemental cobalt and passing the same into a contact zone at a temperature of about 290° to about 380° F. containing a metal catalyst selected from the metals of group VIII of the periodic table, flowing said aldehydic product through said contact zone together with hydrogen under adiabatic conditions adjusted to produce at the exit end of said zone a temperature in excess of that of the incoming aldehydic product and obtain appreciable hydrogenation of aldehydes present in the aldehydic product and decomposition of said iron carbonyl, thereafter flowing the aldehydic product from said contact zone in the presence of hydrogen directly without loss of heat and without further addition of heat to a hydrogenation zone containing a metallic hydrogenation catalyst and maintained at an elevated pressure and temperature sufficient to hydrogenate the remaining aldehydes in the aldehydic product to the corresponding alcohols and maintaining the flow of aldehydic product through said contact zone until the temperature rise through said contact zone is less than about 10° to about 20° F.

3. A process for the production of alcohols which comprises reacting a synthesis gas containing hydrogen and carbon monoxide with an olefin in a hydroformylation reaction zone at a hydroformylation reaction temperature and hydroformylation reaction pressure to form an aldehydic product contaminated with cobalt carbonyl and iron carbonyl, passing the aldehydic product to a demetalling zone containing a packing material, maintaining a temperature in said demetalling zone of about 210° to about 400° F., whereby cobalt carbonyl is decomposed and elemental cobalt is deposited on said packing material, removing the treated aldehydic product from said demetalling zone substantially free of elemental cobalt and passing the same into a contact zone at a temperature of about 290° to about 380° F. containing a metal catalyst selected from the metals of group VIII of the periodic table, flowing said aldehydic product through said contact zone together with hydrogen and about ⅛ to about ½ gallon of water per gallon of said treated aldehydic product under adiabatic conditions adjusted to produce at the exit end of said zone a temperature in excess of that of the incoming aldehydic product and obtain appreciable hydrogenation of aldehydes present in the aldehydic product and decomposition of said iron carbonyl, and thereafter flowing the aldehydic product from said contact zone in the presence of hydrogen directly without loss of heat and without further addition of heat to a hydrogenation zone containing a metallic hydrogenation catalyst and maintained at an elevated pressure and temperature sufficient to hydrogenate the remaining aldehydes in the aldehydic product to the corresponding alcohols.

References Cited in the file of this patent

UNITED STATES PATENTS

| | | |
|---|---|---|
| 2,150,270 | Durrans et al. | May 14, 1939 |
| 2,571,160 | Parker et al. | Oct. 16, 1951 |
| 2,581,988 | Spijker et al. | Jan. 8, 1952 |
| 2,679,534 | Koontz | May 25, 1954 |
| 2,700,687 | Catterall | Jan. 25, 1955 |
| 2,709,713 | Mertzweiller et al. | May 31, 1955 |

FOREIGN PATENTS

| | | |
|---|---|---|
| 655,024 | Great Britain | July 4, 1951 |
| 671,608 | Great Britain | May 7, 1952 |

OTHER REFERENCES

Willemart: Bull. Soc. Chim. de France, 5th Series, vol. 14, March–April 1947, pp. 152 to 154.

UNITED STATES PATENT OFFICE
CERTIFICATE OF CORRECTION

Patent No. 2,815,390                                                                           December 3, 1957

Bernard H. Gwynn et al.

It is hereby certified that error appears in the printed specification of the above numbered patent requiring correction and that the said Letters Patent should read as corrected below.

Column 8, line 62, for "400° C." read -- 400° F. --; column 9, lines 53 and 54, for "hydrogenaton" read -- hydrogenation --; column 12, line 53, list of References Cited", under the heading "UNITED STATES PATENTS", for "May 14, 1939" read -- March 14, 1939 --.

Signed and sealed this 21st day of January 1958.

(SEAL)
Attest:

KARL H. AXLINE
Attesting Officer

ROBERT C. WATSON
                                                                                                                                 Commissioner of Patents